US008438251B2

(12) United States Patent
Trent

(10) Patent No.: US 8,438,251 B2
(45) Date of Patent: May 7, 2013

(54) METHODS AND SYSTEMS FOR IMPLEMENTING A VIRTUAL STORAGE NETWORK

(75) Inventor: Jeffrey Trent, Medford, NJ (US)

(73) Assignee: Oracle International Corporation, Redwood Shores, CA (US)

( * ) Notice: Subject to any disclaimer, the term of this patent is extended or adjusted under 35 U.S.C. 154(b) by 345 days.

(21) Appl. No.: 12/845,009

(22) Filed: Jul. 28, 2010

(65) Prior Publication Data

US 2011/0087848 A1   Apr. 14, 2011

Related U.S. Application Data

(60) Provisional application No. 61/250,068, filed on Oct. 9, 2009.

(51) Int. Cl.
*G06F 15/16* (2006.01)
*G06F 12/00* (2006.01)

(52) U.S. Cl.
USPC ........... 709/220; 709/203; 709/225; 709/226; 709/223; 715/738; 715/810; 715/736; 711/154; 711/162; 711/161; 711/165

(58) Field of Classification Search .................. 709/220, 709/226, 223, 229, 224
See application file for complete search history.

(56) References Cited

U.S. PATENT DOCUMENTS

| 6,178,529 | B1 * | 1/2001 | Short et al. ................. 714/51 |
| 7,519,711 | B2 | 4/2009 | Mohindra et al. |
| 7,735,085 | B2 * | 6/2010 | Geib et al. ................ 718/104 |
| 7,945,671 | B2 | 5/2011 | Mohindra et al. |
| 2005/0005250 | A1 | 1/2005 | Jones |
| 2005/0138618 | A1 * | 6/2005 | Gebhart ..................... 717/176 |
| 2006/0101444 | A1 | 5/2006 | Pepin et al. |
| 2006/0294238 | A1 | 12/2006 | Naik et al. |
| 2007/0174815 | A1 | 7/2007 | Chrysanthakopoulos et al. |
| 2007/0240109 | A1 | 10/2007 | Chandra et al. |
| 2007/0294364 | A1 | 12/2007 | Mohindra et al. |
| 2007/0294405 | A1 | 12/2007 | Mohindra et al. |
| 2008/0092140 | A1 * | 4/2008 | Doninger et al. ............. 718/102 |
| 2008/0126110 | A1 | 5/2008 | Haeberle et al. |
| 2008/0168424 | A1 | 7/2008 | Mohindra et al. |
| 2008/0275935 | A1 | 11/2008 | Mohindra et al. |
| 2011/0087848 | A1 * | 4/2011 | Trent ......................... 711/154 |
| 2011/0088044 | A1 | 4/2011 | Trent |

OTHER PUBLICATIONS

Foster, I., et al. "Grid Services for Distributed System Integration," Computer, IEEE Computer Society, Jun. 2002, 10 pages.
Misek, R., "Definig a Data Grid—Coherence 3.5 User Guide—Oracle Coherence Knowledge Base," Oracle, Oct. 5, 2009, 3 pages.
U.S. Appl. No. 12/845,002, filed Jul. 28, 2010, Office Action mailed Sep. 13, 2012, 31 pages.

* cited by examiner

*Primary Examiner* — Jude Jean Gilles
(74) *Attorney, Agent, or Firm* — Kilpatrick Townsend & Stockton LLP

(57) ABSTRACT

Embodiments of the invention provide systems and methods for implementing a virtual Storage Area Network (SAN) in software. According to one embodiment, a method for implementing a virtual SAN can comprise defining an application for accessing a computing grid for storing information wherein defining the application for accessing the computing grid for storing the information comprises defining a resource and defining one or more state objects for the resource, wherein the one or more state objects are handled independent from the resource. For example, the computing grid can comprise an Oracle Coherence grid. Such a computing grid can maintain a primary copy and a backup copy of the information and provides the backup of the information if the primary copy is unavailable. The information stored on the computing grid can be accessed via the application.

20 Claims, 5 Drawing Sheets

METHODS AND SYSTEMS FOR IMPLEMENTING A VIRTUAL STORAGE NETWORK

REFERENCE TO RELATED APPLICATIONS

This application is related to and claims the benefit of U.S. Provisional Patent Application No. 61/250,068 filed Oct. 9, 2009 by Trent and entitled "Cachedfile" of which the entire disclosure is incorporated herein by reference for all purposes.

The present application is also related to U.S. patent application Ser. No. 12/845,002 entitled "Methods and Systems for Implementing a Logical Programming Model," which is filed concurrently herewith and also incorporated herein by reference for all purposes.

BACKGROUND

Embodiments of the present invention relate generally to methods and systems for data storage and more particularly to implementing a virtual Storage Area Network (SAN) in software.

A Storage Area Network (SAN) is generally defined as a high-speed, special-purpose network (or subnetwork) that interconnects different kinds of data storage to a server or other computer system in such a way that the storage devices appear as locally attached to and accessible through an operating system of the server or computer. Traditionally, SAN implementation required the purchase and installation of hardware. Thus, extensive installation and configuration was also required to add the hardware to a network, address it, etc. Hence, there is a need for improved methods and systems for implementing a SAN.

SUMMARY

Embodiments of the invention provide systems and methods for implementing a virtual Storage Area Network (SAN) in software. According to one embodiment, a method for implementing a virtual SAN can comprise defining an application for accessing a computing grid for storing information wherein defining the application for accessing the computing grid for storing the information comprises defining a resource and defining one or more state objects for the resource, wherein the one or more state objects are handled independent from the resource. For example, the computing grid can comprise an Oracle Coherence grid. Such a computing grid can maintain a primary copy and a backup copy of the information and provides the backup of the information if the primary copy is unavailable. The information stored on the computing grid can be accessed via the application.

In some cases, the application can include a URL handler and accessing the information stored on the grid can comprise invoking the URL handler. Additionally or alternatively, the application may extend the information stored in the computing grid to a web container. In some cases, the application can additionally or alternatively be adapted to destroy the information stored in the computing grid after the information has been entirely read once. Additionally or alternatively, the application can be adapted to expire the information in the computing grid based on one or more pre-defined conditions.

According to another embodiment, a system can comprise a processor and a memory communicatively coupled with and readable by the processor. The memory can have stored therein a series of instructions which, when executed by the processor, cause the processor to implement a virtual Storage Area Network (SAN) by defining an application for accessing a computing grid for storing information wherein defining the application for accessing the computing grid for storing the information comprises defining a resource and defining one or more state objects for the resource, wherein the one or more state objects are handled independent from the resource. For example, the computing grid can comprise an Oracle Coherence grid. Such a computing grid can maintain a primary copy and a backup copy of the information and provides the backup of the information if the primary copy is unavailable. The information stored on the computing grid can be accessed via the application.

In some cases, the application can include a URL handler and accessing the information stored on the grid can comprise invoking the URL handler. Additionally or alternatively, the application may extend the information stored in the computing grid to a web container. In some cases, the application can additionally or alternatively be adapted to destroy the information stored in the computing grid after the information has been entirely read once. Additionally or alternatively, the application can be adapted to expire the information in the computing grid based on one or more pre-defined conditions.

According to yet another embodiment, a machine-readable memory can have stored therein a series of instructions which, when executed by a processor, cause the processor to implement a virtual Storage Area Network by defining an application for accessing a computing grid for storing information wherein defining the application for accessing the computing grid for storing the information comprises defining a resource and defining one or more state objects for the resource, wherein the one or more state objects are handled independent from the resource. The information stored on the computing grid can be accessed via the application. For example, the application can include a URL handler and accessing the information stored on the grid comprises invoking the URL handler. Additionally or alternatively, the application extends the information stored in the computing grid to a web container.

DETAILED DESCRIPTION

Figure 1:
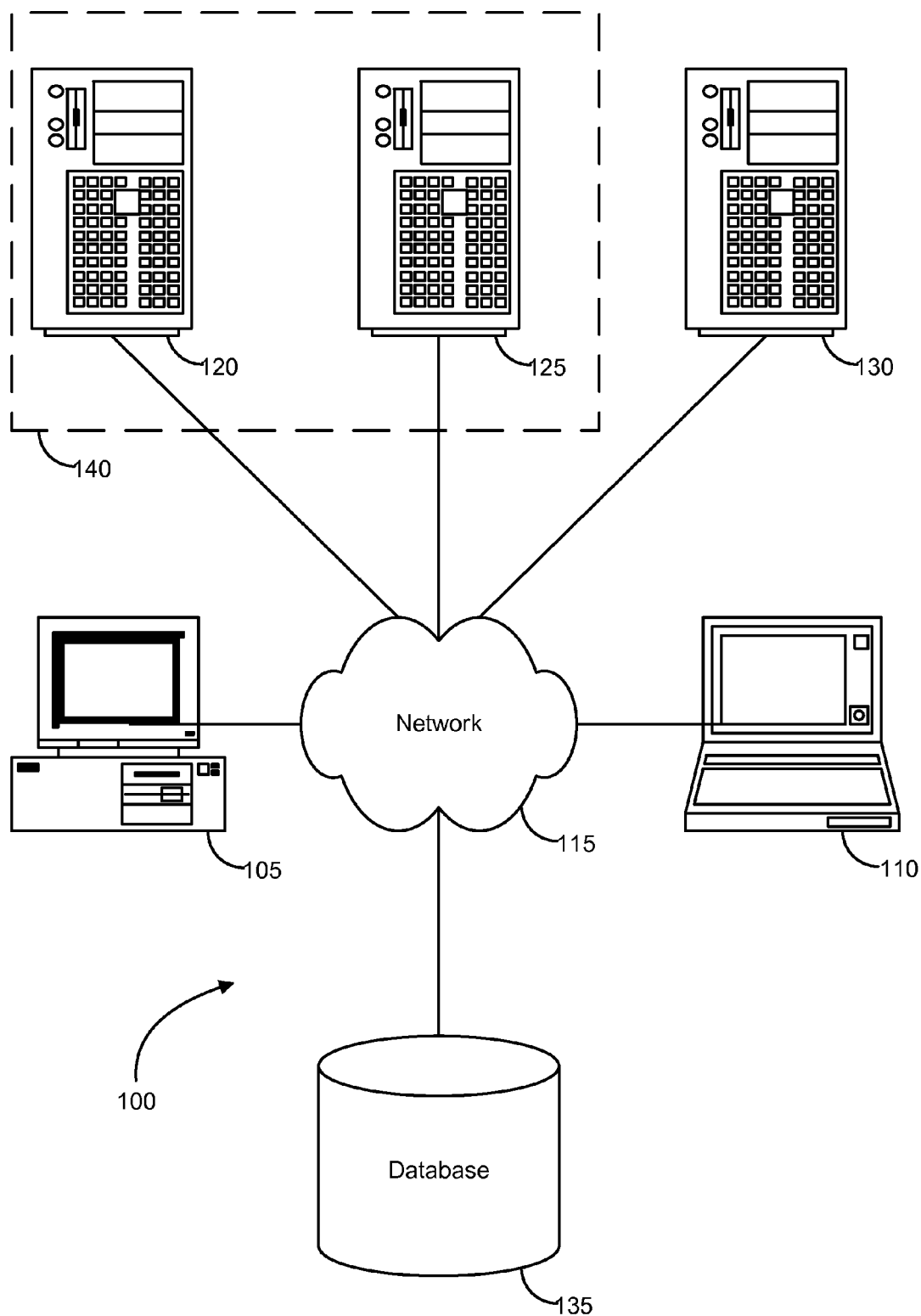
FIG. 1 is a block diagram illustrating components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for implementing a virtual Storage Area Network (SAN) in software. More specifically, embodiments of the present invention are directed to a software abstraction of a SAN that includes an application that provides a virtual representation of the SAN. The application can implemented so that it can be treated like a file system, i.e., through the application other applications can read and write files to or from storage as if reading and writing files to or from a file system. The application for implementing the virtual SAN can be executed in may different environments. According to one embodiment, the application can be executed on a computing grid such as, for example, an Oracle Coherence grid.

According to one embodiment, the application for providing the virtual SAN can be implemented according to a programming model in which a resource and one or more state objects for the resource can be defined such that the resource and the state objects for that resource can be handled independently. The resource and the one or more state objects can also be location agnostic and environment agnostic. That is, the resource needs not be aware of the environment in which it is operating and/or where it is located with regard to other resources around it and can act autonomously.

Additionally, the application implementing the virtual SAN can provide a number of different functions or features related to the information stored thereby. For example, depending upon the grid or other system upon which the information is stored, the application my provide or support RAID-like backup features in which a redundant or backup copy of a primary copy of the information is maintained and made available in case that the primary copy becomes unavailable. In another example, the application may support expiration of information in the virtual SAN based on a time, date, age, number of accesses or any number of other conditions. In yet another example and possibly in addition to providing other authorization and/or access control features, the application may provide a feature to delete and destroy, i.e., wipe, a particular file or set of information when it has been read once, in its entirety. In still another example, the application can extend some or all of the file system represented by the virtual San to a web container such that a portion or all of the information can be accessed through a defined name space for a web interface. Various additional details of embodiments of the present invention will be described below with reference to the figures.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
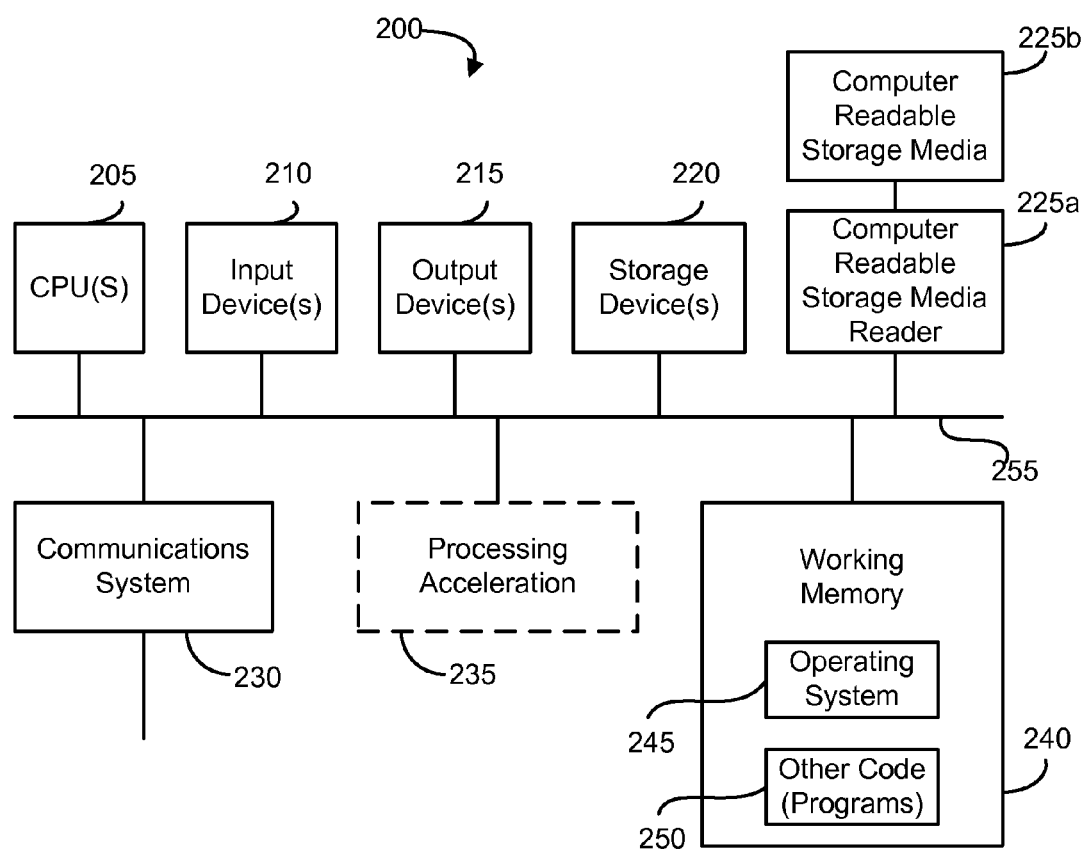
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Figure 3:
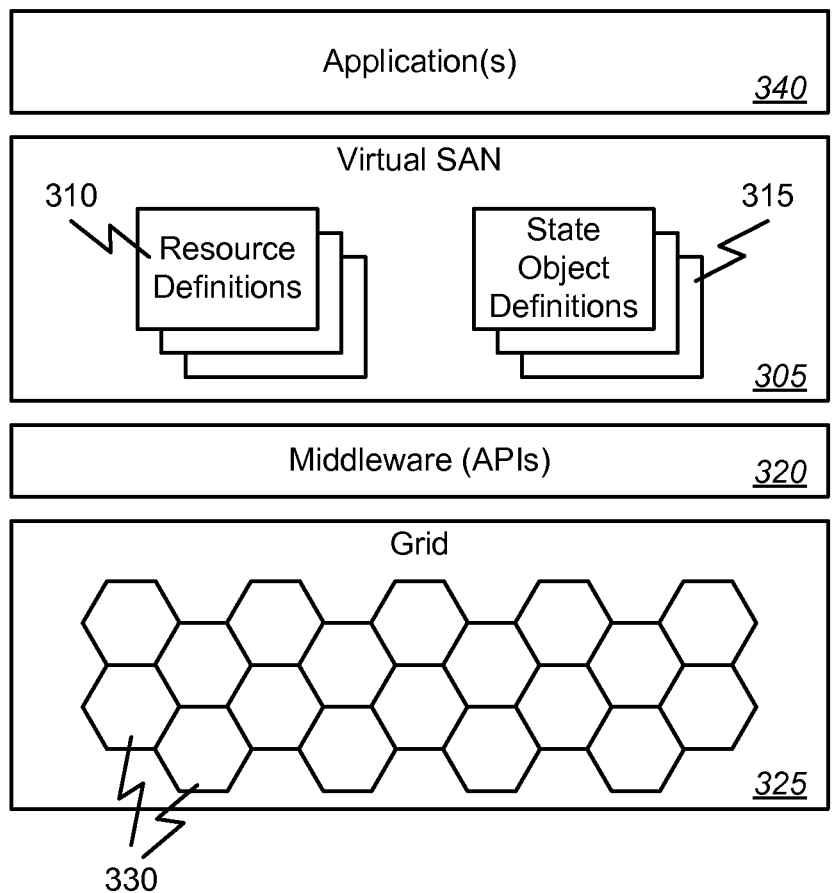
FIG. 3 is a block diagram illustrating implementation of a virtual Storage Area Network (SAN) according to one embodiment of the present invention.

FIG. 3 is a block diagram illustrating implementation of a virtual Storage Area Network (SAN) according to one embodiment of the present invention. As noted above, embodiments of the present invention are directed to a software abstraction of a SAN that includes an application 305 that provides a virtual representation of the SAN. The application 305 can be implemented so that it can be treated like a file system, i.e., through the application 305 other applications 340 can read and write files to or from storage as if reading and writing files to or from a file system. The application 305 for implementing the virtual SAN can be executed in may different environments. According to one embodiment, the application can be executed on a computing grid 325 such as, for example, an Oracle Coherence grid.

According to one embodiment, the application 305 for providing the virtual SAN can be implemented according to a programming model in which a resource and one or more state objects for the resource can be defined such that the resource and the state objects for that resource can be handled independently. The resource and the one or more state objects can also be location agnostic and environment agnostic. That is, the resource needs not be aware of the environment in which it is operating and/or where it is located with regard to other resources around it and can act autonomously. Implementing a logical programming model according to embodiments described herein can comprise defining a resource 310 or set of resources and defining one or more state objects 315 for each resource. The resources defined by the resource definitions 310 can be implemented on one or more nodes 330 of a computing grid 325. This grid 325 can be implemented with and accessed by a middleware 320 that can include an Application Program Interface (API).

According to this model, the one or more state objects 315 can be handled independent from the resources. For example, the one or more state objects 315 can include a global state object available to a plurality of resources. The one or more state objects 315 can also include a conversational state object representing an information flow for the resource. The one or more state objects 315 may also include a request state object representing platform specific information for the resource. Additionally or alternatively, the one or more state objects 315 can include a session state object representing information specific to a session of the resource.

According to one embodiment, the resource definitions 310 can comprises definitions of a process. For example, the process can comprise a service or a plurality of services for supporting the virtual SAN as will be described further below. Accordingly, the one or more state object definitions 315 can define state objects for each of the plurality of services. As noted above, the plurality of services can be executed on the computing grid 325. For example, in one implementation, the grid 325 can comprise an Oracle Coherence grid. In such a case, the APIs of the middleware 320 can include interfaces that can be used by the application 305 to access the information stored on the nodes 330 of the grid 325.

As noted above, the application 305 implementing the virtual SAN can provide a number of different functions or features related to the information stored thereby. For example, depending upon the grid 325 or other system upon which the information is stored, the application 305 my provide or support RAID-like backup features in which a redundant or backup copy of a primary copy of the information is maintained and made available in case that the primary copy becomes unavailable. In another example, the application 305 may support expiration of information in the virtual SAN based on a time, date, age, number of accesses or any number of other conditions. In yet another example and possibly in addition to providing other authorization and/or access control features, the application 305 may provide a feature to delete and destroy, i.e., wipe, a particular file or set of information when it has been read once, in its entirety. In still another example, the application 305 can extend some or all of the file system represented by the virtual San to a web container such that a portion or all of the information can be accessed through a defined name space for a web interface.

According to one embodiment, the application 305 can provide access to the information of the virtual SAN without relying on a proprietary interface. For example, the application 305 may implement, e.g., as a service or resource 310, a URL handler. Such a URL handler may use, for example, constructs of the Java Developer Kit (JDK) such as FileInputStream and FileOutputStream for basic access of the information of the virtual SAN. In some cases, URLs of the virtual San accessed in this manner may be identified and preceded by a particular protocol identifier. For example, URLs of the virtual SAN may be preceded by a protocol identifier such as "coh:" to identify and/or invoke the handler.

As noted above, the application 305 for providing the virtual SAN can be implemented according to a programming model in which a resource and one or more state objects for the resource can be defined such that the resource and the state objects for that resource can be handled independently. An example of such a programming model is described in detail in the Related Application entitled "Methods and Systems for Implementing a Logical Programming Model" referenced above and incorporated herein. As described therein, a logical programming model can be implemented by defining a resource and defining one or more state objects for the resource. The resource and the one or more state objects can also be location agnostic and environment agnostic. That is, the resource needs not be aware of the environment in which it is operating and/or where it is located with regard to other resources around it and can act autonomously. In this programming model, the one or more state objects can be handled independent from the resource. For example, the one or more state objects can include a global state object available to a plurality of resources. The one or more state objects can also include a conversational state object representing an information flow for the resource. The one or more state objects may also include a request state object representing platform specific information for the resource. Additionally or alternatively, the one or more state objects can include a session state object representing information specific to a session of the resource.

Figure 4:
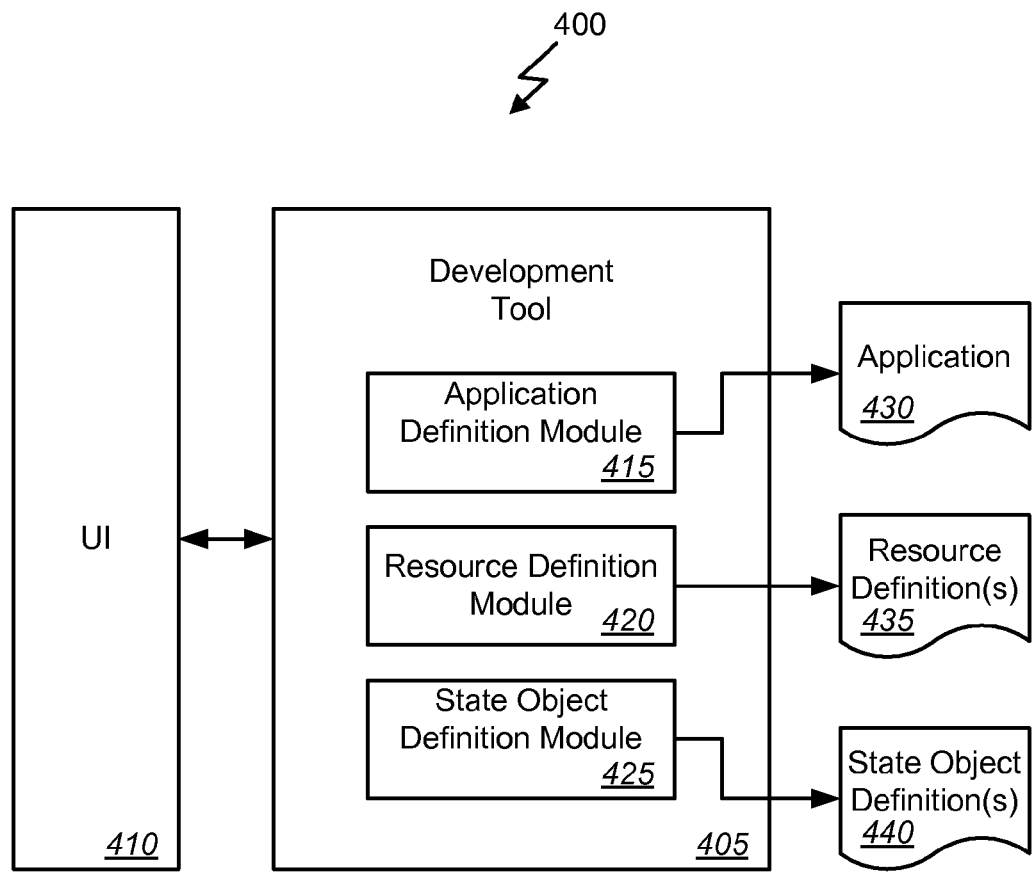
FIG. 4 is a block diagram illustrating implementation of a logical programming model according to one embodiment of the present invention.

FIG. 4 is a block diagram illustrating implementation of a logical programming model according to one embodiment of the present invention. As described above with reference to the computer system 200 of FIG. 2, a system, i.e., a development system, can comprise a processor 205 and a memory 240 communicatively coupled with and readable by the processor 205. The memory 240 can have stored therein a series of instructions which, when executed by the processor 205, cause the processor to execute a development environment 400 for implementing a logical programming model. The development environment 400 can include a development tool 405 and a user interface 410. The development tool 405 can comprise an application through which a programmer or developer can generate applications according to the logical programming model described herein. The user interface 410 can comprise any textual, graphical, or other interface through which the programmer or developer can access and interact with the development tool 405.

The development tool 405, based on instructions another input from the developer through the user interface 410, can be adapted to define a resource. That is, a resource definition module 420 of the development tool 405 can generate one or more resource definitions 435. The development tool 405 can also be adapted to define state objects for each resource. That is, a state object definition module 425 of the development tool 405 can generate one or more state object definitions 435 for each resource based on instructions another input from the developer through the user interface 410.

The development tool 405 can also, and again based on instructions another input from the developer through the user interface 410, be adapted to define an application. That is, an application definition module 415 for generating a high level language program and perhaps including a compiler, can generate an application 430. The application 430 can include at least one instance of the defined resource and at least one instance of the defined one or more state objects. The logic of the application can handle the one or more state objects independent from the resource.

As noted above, the resource or multiple resources defined by resource definitions 435 can referenced in application 430 can comprise one or more processes. For example the processes can comprise a service or a plurality of services utilized by the application 430. Furthermore, in some cases, a federation of services can be defined within the plurality of services can be defined, for example within the resource definitions 435. The services of the federation can share at least one state object of the state object definitions 440. Whether federated or not, the plurality of services can be executed on a computing grid such as, for example, an Oracle Coherence grid and accessed via membership and routing protocols of the grid as noted above.

Figure 5:
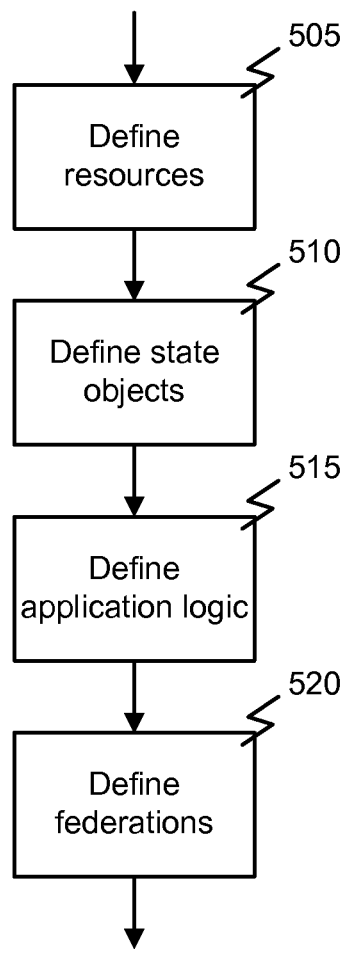
FIG. 5 is a flowchart illustrating a process for implementation of a logical programming model according to one embodiment of the present invention.

FIG. 5 is a flowchart illustrating a process for implementation of a logical programming model according to one embodiment of the present invention. In this example, implementing a logical programming model can comprise defining 505 a resource and defining 510 one or more state objects for the resource. For example, the one or more state objects can include a global state object available to a plurality of resources. Additionally or alternatively, the one or more state objects may include a conversational state object representing an information flow for the resource. The one or more state objects can include a request state object representing platform specific information for the resource. In some cases, one or more state objects can additionally or alternatively include a session state object representing information specific to a session of the resource. The resource and the one or more state objects can be location agnostic and environment agnostic.

An application process or logic can be defined 515 including at least one instance of the defined resource and at least one instance of the defined one or more state objects. Logic of the application can handle the one or more state objects independent from the resource. In some cases, the resource or multiple resources can comprise one or more processes. For example the process can comprise a service or a plurality of services. In such a case, one or more state objects can be defined for each of the plurality of services. Furthermore, in some cases, a federation of services within the plurality of services can be defined 520 wherein the services of the federation share at least one state object.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for implementing a virtual Storage Area Network (SAN), the method comprising:
   defining by a development system a resource;
   defining by the development system one or more state objects for the resource; and
   defining by the development system an application for accessing the resource on a computing grid for storing information wherein the application for accessing the resource handles the one or more state objects independent from the resource and provides a representation of the virtual SAN as a file system through which other applications read and write to the virtual SAN.

2. The method of claim 1, further comprising accessing the information stored on the computing grid via the application.

3. The method of claim 1, wherein the computing grid comprises an Oracle Coherence grid.

4. The method of claim 3, wherein the computing grid maintains a primary copy and a backup copy of the information and provides the backup of the information if the primary copy is unavailable.

5. The method of claim 2, wherein the application includes a URL handler and accessing the information stored on the grid comprises invoking the URL handler.

6. The method of claim 2, wherein the application extends the information stored in the computing grid to a web container.

7. The method of claim 2, wherein the application is adapted to destroy the information stored in the computing grid after the information has been entirely read once.

8. The method of claim 2, wherein the application is adapted to expire the information in the computing grid based on one or more pre-defined conditions.

9. A system comprising:
   a processor; and
   a memory communicatively coupled with and readable by the processor and having stored therein a series of instructions which, when executed by the processor, cause the processor to implement a virtual Storage Area Network (SAN) by defining an application for accessing a computing grid for storing information wherein the application for accessing the computing grid for storing the information comprises defining a resource and defining one or more state objects for the resource, wherein the one or more state objects are handled independent from the resource and wherein the application provides a representation of the virtual SAN as a file system through which other applications read and write to the virtual SAN.

10. The system of claim 9, further comprising accessing the information stored on the computing grid via the application.

11. The system of claim 9, wherein the computing grid comprises an Oracle Coherence grid.

12. The system of claim 11, wherein the computing grid maintains a primary copy and a backup copy of the information and provides the backup of the information if the primary copy is unavailable.

13. The system of claim 10, wherein the application includes a URL handler and accessing the information stored on the grid comprises invoking the URL handler.

14. The system of claim 10, wherein the application extends the information stored in the computing grid to a web container.

15. The system of claim 10, wherein the application is adapted to destroy the information stored in the computing grid after the information has been entirely read once.

16. The system of claim 10, wherein the application is adapted to expire the information in the computing grid based on one or more pre-defined conditions.

17. A machine-readable memory having stored therein a series of instructions which, when executed by a processor, cause the processor to implement a virtual Storage Area Network by defining an application for accessing a computing grid for storing information wherein the application for accessing the computing grid for storing the information comprises defining a resource and defining one or more state objects for the resource, wherein the one or more state objects are handled independent from the resource and wherein the application provides a representation of the virtual SAN as a file system through which other applications read and write to the virtual SAN.

18. The machine-readable memory of claim 17, further comprising accessing the information stored on the computing grid via the application.

19. The machine-readable memory of claim 18, wherein the application includes a URL handler and accessing the information stored on the grid comprises invoking the URL handler.

20. The machine-readable memory of claim 18, wherein the application extends the information stored in the computing grid to a web container.

* * * * *

UNITED STATES PATENT AND TRADEMARK OFFICE
CERTIFICATE OF CORRECTION

PATENT NO. : 8,438,251 B2
APPLICATION NO. : 12/845009
DATED : May 7, 2013
INVENTOR(S) : Trent Page 1 of 1

It is certified that error appears in the above-identified patent and that said Letters Patent is hereby corrected as shown below:

On title page, in column 2, under "Other Publications", line 3, delete ""Definig" and insert -- "Defining --, therefor.

In the Specification

In column 3, line 57, delete "may" and insert -- many --, therefor.

In column 4, line 49, delete "may can be" and insert -- can be --, therefor.

In column 6, line 44, delete "may" and insert -- many --, therefor.

Signed and Sealed this
Seventeenth Day of September, 2013

Teresa Stanek Rea
*Deputy Director of the United States Patent and Trademark Office*